(12) United States Patent  
Lim et al.

(10) Patent No.: US 6,367,831 B1
(45) Date of Patent: Apr. 9, 2002

(54) MANUALLY ADJUSTABLE TRANSVERSE DUAL LEAF SUSPENSION

(75) Inventors: Stephen Lim, Ann Arbor; Michael Smith, Plymouth, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/684,867

(22) Filed: Oct. 6, 2000

(51) Int. Cl.[7] .............................................. B60G 17/00
(52) U.S. Cl. ............................ 280/124.102; 280/6.157; 280/124.171; 267/242
(58) Field of Search ..................... 280/6.15, 6.151, 280/6.157, 124.102, 124.171, 5.515; 267/242, 244, 38

(56) References Cited

U.S. PATENT DOCUMENTS

| | | | |
|---|---|---|---|
| 1,664,618 A | * | 4/1928 | Fry .............................. 267/244 |
| 2,030,557 A | * | 2/1936 | Wagner ....................... 267/230 |
| 3,170,712 A | * | 2/1965 | Hildebrandt et al. ....... 280/6.15 |
| 3,600,002 A | * | 8/1971 | Benwell ...................... 267/230 |
| 4,266,790 A | | 5/1981 | Uemura et al. |
| 4,462,610 A | | 7/1984 | Saito et al. |
| 4,518,169 A | | 5/1985 | Kuroki et al. |
| 4,593,931 A | | 6/1986 | Shiratori et al. |
| 4,787,644 A | | 11/1988 | Yokote et al. |
| 4,858,950 A | * | 8/1989 | Kajiwara et al. ............ 280/719 |
| 4,867,474 A | * | 9/1989 | Smith ....................... 280/5.507 |
| 4,903,984 A | * | 2/1990 | Kajiwara et al. ......... 280/5.515 |
| 4,965,878 A | | 10/1990 | Yamagiwa et al. |
| 5,013,067 A | | 5/1991 | Mine et al. |
| 5,287,277 A | | 2/1994 | Mine et al. |
| 5,306,031 A | * | 4/1994 | Quinn et al. ............... 280/6.15 |
| 5,553,836 A | | 9/1996 | Ericson |

* cited by examiner

Primary Examiner—J. J. Swann
Assistant Examiner—David R. Dunn
(74) Attorney, Agent, or Firm—Mark P. Calcaterra (57) ABSTRACT

The adjustable suspension includes a first and second pair of transversely disposed leaf springs supporting the vehicle. Each leaf spring includes a threaded aperture formed therein. A first and second threaded, rotatable, spindle respectively engages the apertures of the first and second pair of leaf springs. The adjustable suspension further includes actuating means for rotatably driving at least one of the spindles and mode selection means for selectively engaging the actuation means with at least one of the spindle in response to a preferred operating mode. Such arrangement facilitates manual height adjustment of the vehicle suspension.

9 Claims, 7 Drawing Sheets

MANUALLY ADJUSTABLE TRANSVERSE DUAL LEAF SUSPENSION

FIELD OF THE INVENTION

The present invention relates to vehicle suspension systems and, more particularly, to a vehicle suspension system capable of manually adjusting the height of the vehicle.

BACKGROUND OF THE INVENTION

As is known in the art, vehicle height adjusting systems are frequently employed to maintain the vertical or level position of a vehicle body relative to the road surface. These systems typically utilize a complicated series of electronics and devices to enable the vehicle to be adjusted for improved driving performance, ride comfort, and appearance. Hydraulic struts or pneumatic bladders are commonly used in the vehicle suspension system to achieve the desired performance or aesthetic results. As can be appreciated by one skilled in the art, these hydraulic struts or pneumatic bladders require various compressors and/or pumps to operate and, thus, increase the complexity and cost of manufacturing such systems.

Moreover, the application of known vehicle height adjusting systems to off-road uses may be limited in that the operational life of conventional height adjusting systems may be reduced due to the off-road environmental conditions. In particular, the severe shock and vibration generated in off-road travel may be transmitted throughout the height adjusting system, thereby causing excessive wear in the pumps and/or compressors. Additionally, off-road contaminants, such as dirt and dust, may cause wear or failure in the adjusting system.

Accordingly, there exists a need in the relevant art to provide a vehicle height adjusting system capable of adjusting simply and conveniently the height of the vehicle without the need for complicated series of electronics and devices. Furthermore, there exists a need in the relevant art to provide a vehicle height adjusting system capable of withstanding the shock, vibration, and contamination common in off-road applications.

SUMMARY OF THE INVENTION

In accordance with the broad teachings of this invention, an adjustable suspension having an advantageous construction is provided. The adjustable suspension includes a first and second pair of transversely disposed leaf springs supporting the vehicle. Each leaf spring includes a threaded aperture formed therein. A first and second threaded, rotatable, spindle extends through the apertures of the first and second pair of leaf springs, respectively, for adjusting the curvature of the first and second pair of leaf springs. The adjustable suspension further includes actuating means for rotatably driving at least one of the spindles and mode selection means for selectively engaging the actuation means with at least one of the spindle in response to a preferred operating mode. Such arrangement facilitates manual height adjustment of the vehicle suspension.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIGS. 3(a)–3(d) are a series of side views illustrating the modes of the mode-select lever.

DETAILED DESCRIPTION OF THE PREFERRED EMBODIMENTS

The following description of the preferred embodiment is merely exemplary in nature and is in no way intended to limit the invention, its application, or uses. For example, the suspension system disclosed herein may have utility in a variety of vehicle applications.

Figure 1:
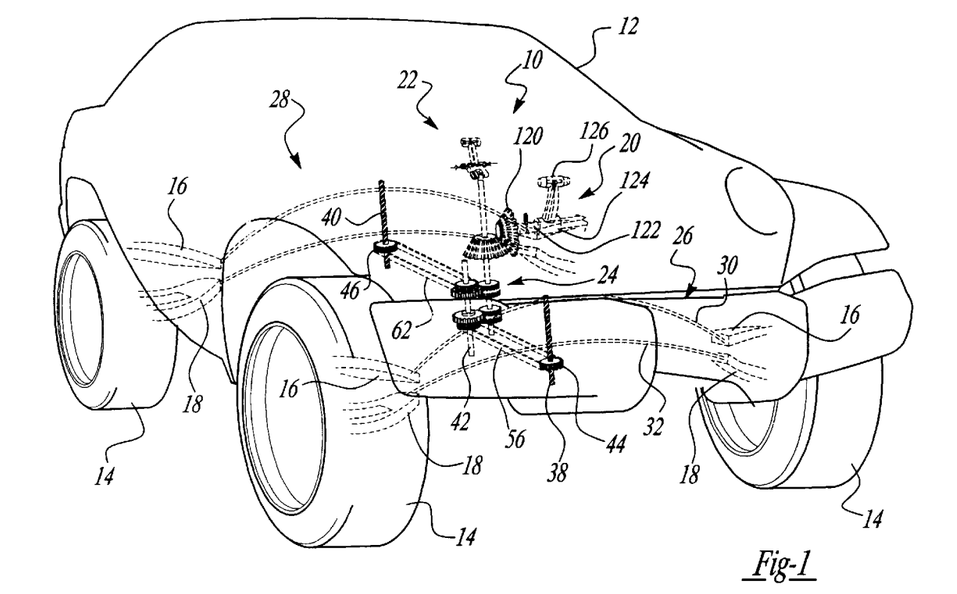
FIG. 1 is a perspective view of a vehicle employing the manually adjustable, transverse, dual leaf suspension according to the teaching of the present invention.
Figure 1A:
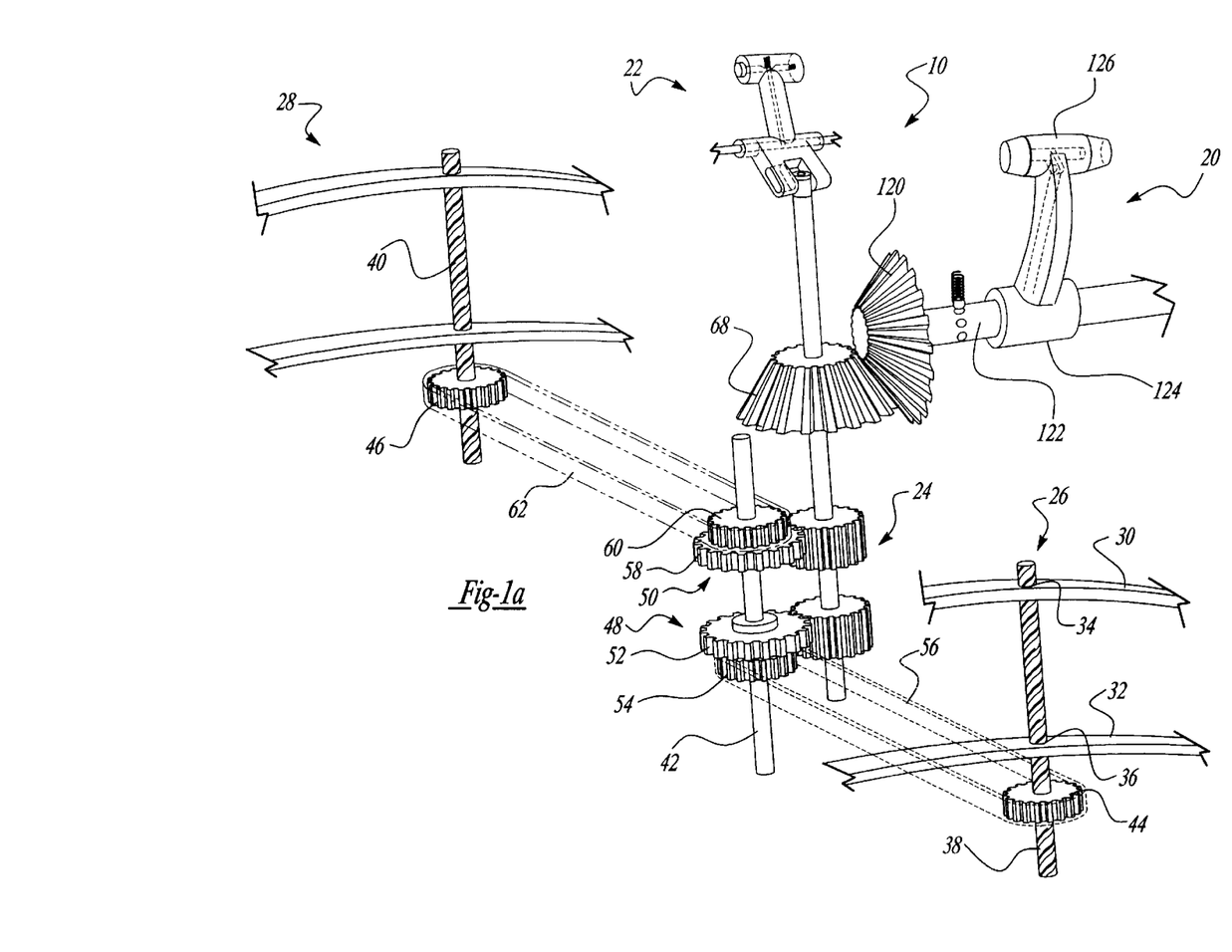

Referring to the drawings, a manually adjustable, transverse, dual leaf spring suspension system 10 is shown. As best seen in FIG. 1, suspension system 10 is adapted to be used in a vehicle 12 having wheels 14 mounted to upper control arms 16 and lower control arms 18 in a known manner. Vehicle 12 is adapted to be used in off-road and on-road applications.

Suspension system 10 includes a ratcheting lever assembly 20, a mode-select lever assembly 22, a drive assembly 24, a front set of leaf springs 26, and a rear set of leaf springs 28. More particularly, the front set of leaf springs 26 includes an upper leaf spring 30 and a lower leaf spring 32. Upper leaf spring 30 is pivotally coupled on opposing ends to upper control arms 16 in a known manner. Upper leaf spring 30 defines a first arcuate path A and includes a centrally disposed threaded aperture 34. Likewise, lower leaf spring 32 is pivotally coupled on opposing ends to lower control arms 18 in a known manner. Lower leaf spring 32 defines a second arcuate path B and includes a centrally disposed threaded aperture 36. Upper leaf springs 30 and lower leaf springs 32 are transversely disposed relative to vehicle 12.

Preferably, the front set of leaf springs 26 is identical to the rear set of leaf springs 28 to minimize manufacturing costs. However, it should be appreciated that front leaf springs may differ from rear leaf springs to provide various suspension characteristics. In the interest of brevity, the design and operation of the front set of leaf springs 26 will be primarily described.

First arcuate path A of upper leaf spring 30 is greater than second arcuate path B of lower leaf spring 32 in order to absorb varied suspension inputs. In particular, the greater curvature of upper leaf spring 30 is capable of absorbing low frequency, high amplitude inputs. On the other hand, the flatter curvature of lower leaf spring 32 is capable of absorbing high frequency, low amplitude inputs. Thus, it should be appreciated that in off-road applications, upper leaf spring 30 will absorb a greater proportion of the road inputs relative to lower leaf spring 32. Alternatively, in on-road applications, lower leaf spring 32 will absorb a greater proportion of the road inputs relative to upper leaf springs 30.

Still referring to FIG. 1, drive assembly 24 includes a front threaded spindle 38, an identical rear threaded spindle 40, and a main spindle 42. In the interest of brevity, only front threaded spindle 38 will be described in detail. Front spindle 38 is vertically disposed such that it threadedly engages aperture 36 of lower leaf spring 32 and aperture 34 of upper leaf spring 30. This threaded engagement enables front spindle 38 to adjust the suspension characteristics of lower leaf spring 32 and upper leaf spring 30. Front spindle 38 further includes a front spindle gear 44 coupled to front spindle 38 to rotate therewith. Similarly, rear spindle 40 includes a rear spindle gear 46 coupled to rear spindle 40 to rotate therewith.

Main spindle 42 is vertically disposed at a point between front spindle 38 and rear spindle 40. Main spindle 42 includes a front set of driven gears 48 and a rear set of driven gears 50 coupled to main spindle 42. The front set of driven gears 48 rotates independently from the rear set of driven gears 50. The front set of driven gears 48 includes a front primary gear 52 and a front secondary gear 54. Front secondary gear 54 is adapted to rotate with front primary gear 52. Front secondary gear 54 drivingly engages front spindle gear 44 by suitable means, such as a belt 56. Likewise, the rear set of driven gears 50 includes a rear primary gear 58 and a rear secondary gear 60. Rear secondary gear 60 is adapted to rotate with rear primary gear 58. Rear secondary gear 60 drivingly engages rear spindle gear 46 by suitable means, such as a belt 62. Main spindle 42 is fixed in position to enable front set of driven gears 48 and rear set of driven gears 50 to rotate independently relative to main spindle 42. It should be appreciated that each set of driven gears is intended to be formed as a single unit to minimize the number of assembly parts. However, other gear configurations are anticipated.

Figure 2A:
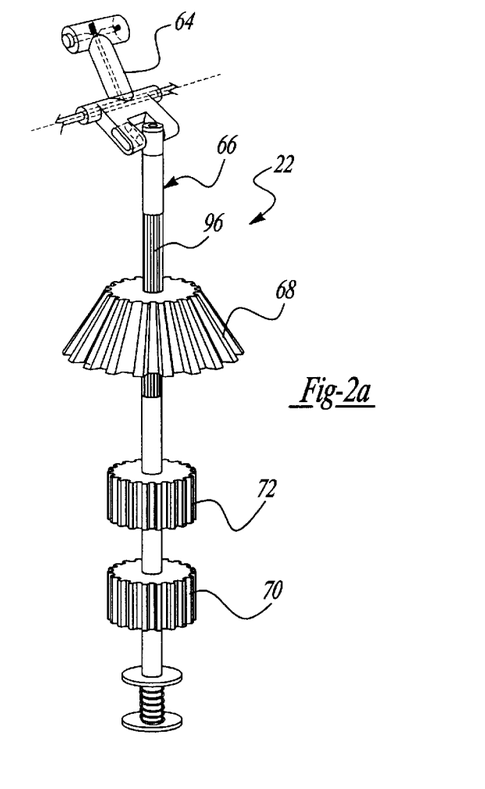
FIG. 2(a) is a perspective view of the mode-select lever assembly.
Figure 2B:
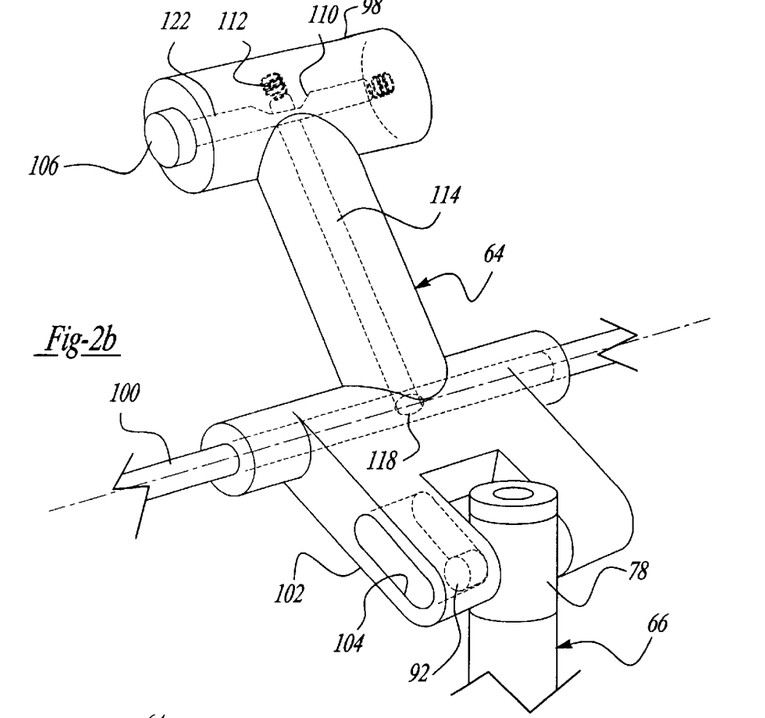
FIG. 2(b) is an enlarged perspective view of the mode-select lever.
Figures 2C, 4C, 4D:
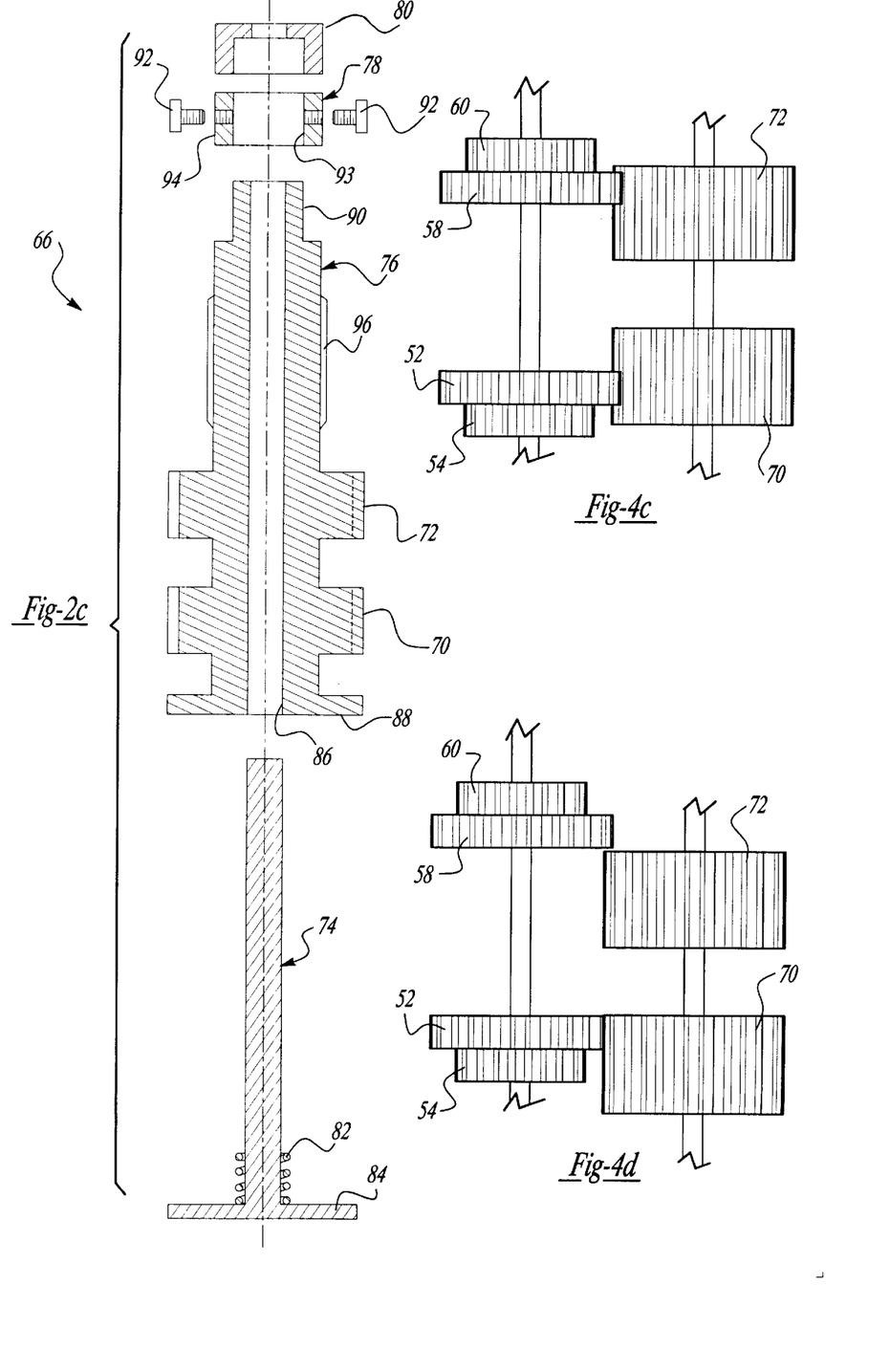
FIG. 2(c) is an exploded view of the mode-select lever assembly with the mode-select lever removed for clarity.
FIGS. 4(a)–4(d) are a series of side views illustrating the modes of the selection gears corresponding to FIGS. 3(a)–3(d), respectively.

Referring to FIGS. 1, 2(*a*), 2(*b*), and 2(*c*), mode-select lever assembly 22 includes a mode-select lever 64, an adjustment spindle assembly 66, a driven bevel gear 68, a first driving gear 70, and a second driving gear 72. First 70 and second 72 driving gears are integrally formed with adjustment spindle assembly 66 to rotate therewith. First driving gear 70 selectively engages front primary gear 52 of the front set of driven gears 48 to transfer torque to front spindle 38. Likewise, second driving gear 72 selectively engages rear primary gear 58 of the rear set of driven gears 50 to transfer torque to rear spindle 40. First driving gear 70 is spaced from second driving gear 72 in order to enable selection of the adjustment mode, which will be described below.

As best seen in FIG. 2(*c*), adjustment spindle assembly 66 includes a cylindrical support rod 74, a rotating sleeve 76, a non-rotating sleeve 78, a cap member 80, and a spring 82. Support rod 74 includes a base portion 84 being integrally formed therewith. Support rod 74 is secured to vehicle 12 in a known manner, such as welding, to provide a rigid support for rotating sleeve 76. Rotating sleeve 76 includes first driving gear 70 and second driving gear 72 being integrally formed therewith. Rotating sleeve 76 further includes an axially extending bore 86 formed therethrough and a flange 88 formed at the lower end of rotating sleeve 76. Bore 86 is adapted to extend closely around support rod 74 to enable rotating sleeve 76 to be rotatable supported by support rod 74. Spring 82 is disposed between flange 88 of rotating sleeve 76 and base portion 84 of support rod 74 to upwardly bias rotating sleeve 76. More particularly, spring 82 acts upon base portion 84 of support rod 74 and flange 88 of rotating sleeve 76 to urge support rod 74 and rotating sleeve 76 apart, thereby forcing rotating sleeve 76 upward.

Rotating sleeve 76 further includes a shoulder portion 90 formed at an upper end of rotating sleeve 76. Shoulder portion 90 is adapted to receive and support non-rotating sleeve 78. Specifically, non-rotating sleeve 78 includes an axially extending bore 93 extending therethrough. Bore 93 of non-rotating sleeve 78 is adapted to extend closely around shoulder portion 90 of rotating sleeve 76 to enable relative rotation therebetween. Non-rotating sleeve 78 further includes a pair of cam pins 92 opposingly spaced along an outer surface 94 of non-rotating sleeve 78. The function of the pair of cam pins 92 will be described below.

Cap member 80 of adjustment spindle assembly 66 is fused to rotating sleeve 76 to rotate therewith. Cap member 80 provides means for retaining non-rotating sleeve 78 with rotating sleeve 76. It should be appreciated that cap member 80 may be fused or fastened to rotating sleeve 76 in any known manner, such as by crimps, welds, threads, or fasteners.

Still referring to FIGS. 1, 2(*a*), 2(*b*), and 2(*c*), driven bevel gear 68 of mode-select lever assembly 22 is splined to rotating sleeve 76 at 96 (see FIGS. 2(*a*) and 2(*c*)) such that rotation of driven bevel gear 68 causes rotating sleeve 76 to rotate therewith. Driven bevel gear 68 is further supported in a known manner to prevent from vertical translation, such as by providing support surfaces above and below driven bevel gear 68. As can be appreciated to one skilled in the art, such arrangement of driven bevel gear 68 enables rotating sleeve 76, first driving gear 70, and second driving gear 72 to translate vertically relative to driven bevel gear 68.

The vertical translation of rotating sleeve 76, first driving gear 70, and second driving gear 72 is achieved using mode-select lever 64 and spring 82. Specifically, spring 82 acts upon base portion 84 of support rod 74 and flange 88 of rotating sleeve 76 to urge rotating sleeve 76 upward. Mode-select lever 64 includes a handle 98, a stationary member 100, and an extension 102. As best seen in FIG. 2(*b*), extension 102 includes a pair of opposingly spaced cam grooves 104 (only one shown). Cams 86 are adapted to receive the pair of cam pins 92 mounted to non-rotating sleeve 78. Such arrangement enables mode-select lever 64 to pivot about stationary member 100, thereby raising or lowering adjustment spindle assembly 66 according to a preferred operation.

Figure 3A:
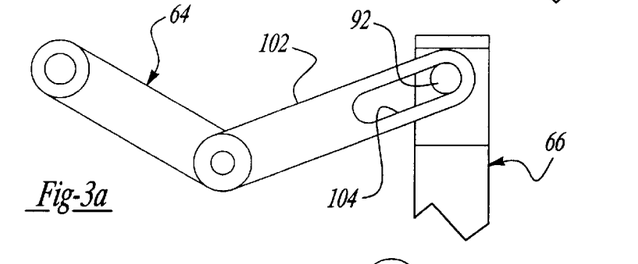
FIG. 3(a) is a side view showing the mode-select lever in a neutral position.
Figure 3B:
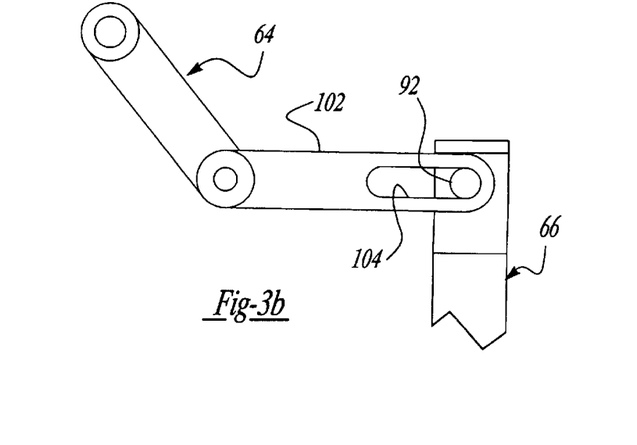
FIG. 3(b) is a side view showing the mode-select lever in a rear-only position.
Figure 3C:
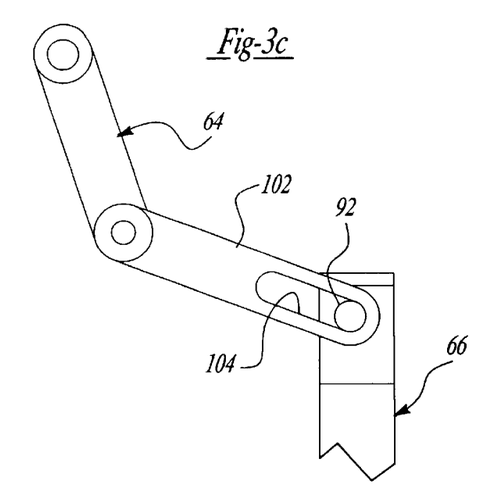
FIG. 3(c) is a side view showing the mode-select lever in a front-and-rear position.
Figure 3D:
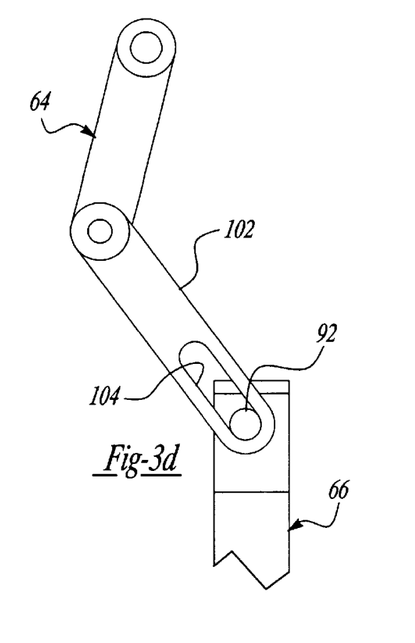
FIG. 3(d) is a side view showing the mode-select lever in a front-only position.
Figure 4A:
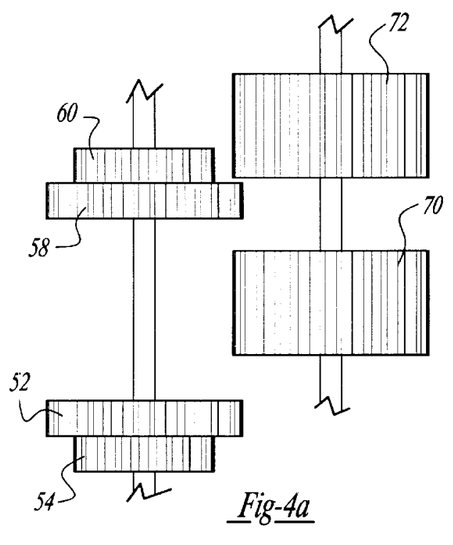
Figure 4B:
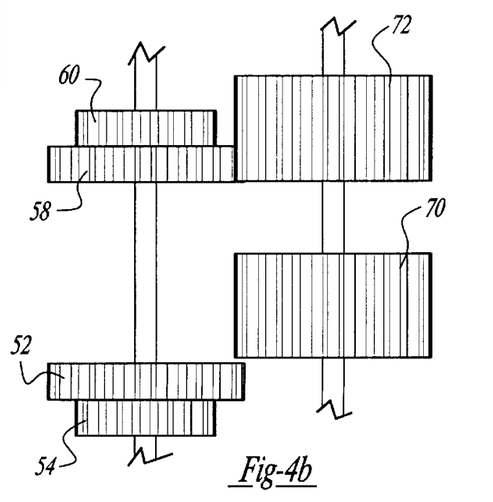

Mode-select lever 64 is retained in one of four preferred mode positions—neutral, rear-only, both, and front-only (see FIGS. 4(*a*)–(*d*))—using a thumb actuator 106 slidably disposed in handle 98 of mode-select lever 64. Thumb actuator 106 includes an actuator shaft 122 having an inclined portion 110 and a spring 112. Spring 112 biases thumb actuator 106 and actuator shaft 122 into a neutral position. Inclined portion 110 is adapted to raise a locking shaft 114 extending between handle 98 and stationary member 100. Locking shaft 114 is normally biased by spring 116 into engagement in one of four apertures 118 (only one shown) disposed in stationary member 100 corresponding to the four preferred mode positions of mode-select lever 64. When thumb actuator 106 is depressed, inclined portion 110 of actuator shaft 122 raises locking shaft 114, thereby disengaging locking shaft 114 from aperture 118. Mode-select lever 64 may then freely pivot about stationary member 100 as seen in FIGS. 3(a)-(d).

Referring now to FIGS. 1 and 5–7, ratcheting lever assembly 20 includes a driving bevel gear 120, a shaft 122, a hub 124, and a handle 126. Hub 124 includes a ratcheting mechanism 128 having a pair of locking arms 130 selectively engaging a pair of respective ratchet gears 132 secured to shaft 122. More particularly, handle 126 includes a rotating end cap 134 having a first shaft 136 fixed for rotation therewith. Rotating end cap 134 is adapted to be retained in one of three ratcheting positions—raise suspension, lower suspension, and neutral-in a known manner, such as a ball detent, snaps, or similar method. First shaft 136 includes a first central arm 138 extending therefrom. First central arm 138 is pivotally coupled to a central shaft 140 for raising central shaft 140 when rotating end cap 134 of handle 126 is rotated. Central shaft 140 is pivotally coupled to a second central arm 142 extending from a second shaft 144. Second shaft 144 is fixed to the pair of locking arms 130 to rotate therewith. Such arrangement enables one of the pair of locking arms 130 to be selectively engaged with one of ratchet gears 132 when rotating end cap 134 is positioned in one of the three operating positions.

Figure 5:
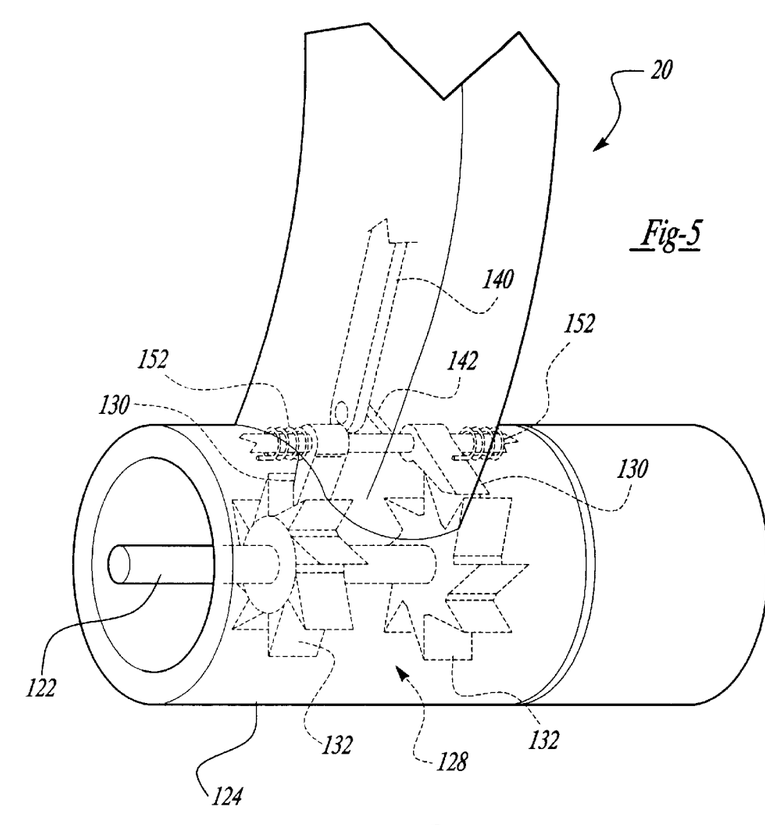
FIG. 5 is a perspective view of the ratcheting mechanism of the actuation means.
Figure 6:
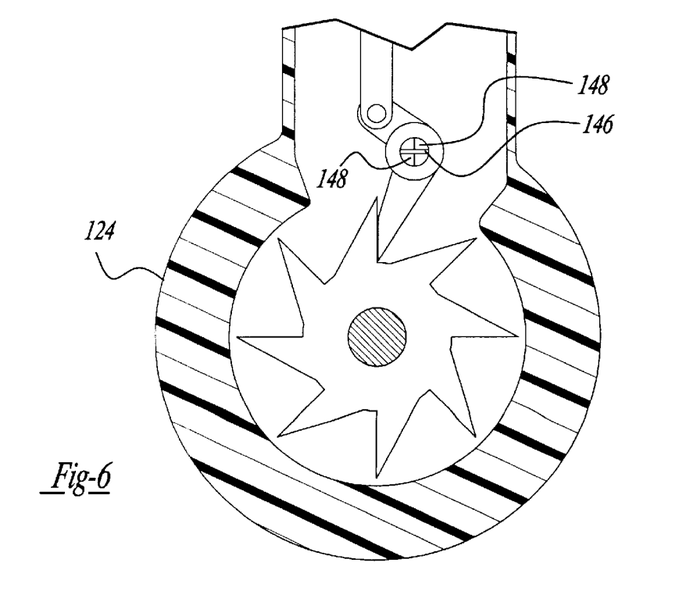
FIG. 6 is a side view of the ratcheting mechanism.
Figure 7:
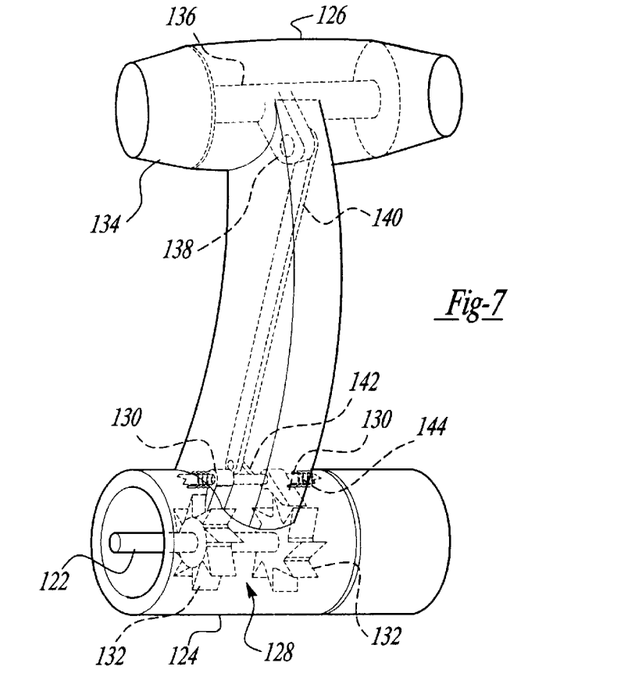
FIG. 7 is a perspective view of the actuation handle and actuation mode mechanism.

Handle 126 pivots about hub 124 such that one of the pair of locking arms 130 forces one of ratchet gears 132 to rotate shaft 122 and driving bevel gear 120 according to the desired operation. It should be noted, however, that each of the pair of locking arms 130 includes a plate member 146 and a cavity 148. Cavity 148 enables each locking arm 130 to ratchet over the teeth of ratchet gear 132 during actuation. That is, a pair of locking arm springs 152 are disposed adjacent each of the pair of locking arms 130. The locking arm springs 152 bias locking arms 130 in an engaged position when rotating end cap 134 of handle 126 is positioned in one of the three operating positions. When handle 126 is pivoted to effect rotation of driving bevel gear 120, plate member 146 of locking arm 130 engages a wall 140 defining cavity 148, thereby enabling locking arm 130 to drive ratchet gear 132. When handle 126 is ratcheted in the non-driving direction, plate member 146 freely pivots within cavity 148 to enable locking arm 130 to retract and ride over the teeth of ratchet gear 132. The locking arm spring then biases locking arm 130 in engagement with an adjacent tooth of ratchet gear 132 to enable the operator to drive driving bevel gear 120. After ratcheting is completed, rotating end caps 134 may be returned to the neutral operating position, thereby disengaging locking arms 130 from ratchet gears 132.

In operation, in order to raise the height of vehicle 12 relative to a ground level, mode-select lever assembly 22 is actuated to selectively engage first 70 and second 72 driving gears with front primary gear 52 and/or rear primary gear 58. As best seen in FIGS. 2–4, thumb actuator 106 is depressed to disengage locking shaft 114 from aperture 118. Mode-select lever 64 is then pivoted about stationary member 100 to one of the four preferred mode positions, as seen in FIGS. 3(a)–(d), thereby rotating extension 102 of mode-select lever 64. The pair of cam pins 92 of non-rotating sleeve 78 cam within cam grooves 104. Such camming action forces rotating sleeve 76 to be vertically translated into a preferred operating mode. More particularly, as seen in FIGS. 3(a) and 4(a), when mode-select lever 64 is in the "neutral" position, first 70 and second 72 driving gears are disengaged from front primary gear 52 and rear primary gear 58. As seen in FIGS. 3(b) and 4(b), when mode-select lever 64 is in the "rear-only" position, first driving gear 70 is disengaged from front primary gear 52 and second driving gear 72 is engaged with rear primary gear 58. Furthermore, as seen in FIGS. 3(c) and 4(c), when mode-select lever 64 is in the "both" position, first 70 and second 72 driving gears are engaged with front primary gear 52 and rear primary gear 58, respectively. Lastly, as seen in FIGS. 3(d) and 4(d), when mode-select lever 64 is in the "front-only" position, first driving gear 70 is engaged with front primary gear 52 and second driving gear 72 is disengaged from rear primary gear 58. It should be appreciated that other engagement configurations are within the spirit of the present invention.

Figure 8:
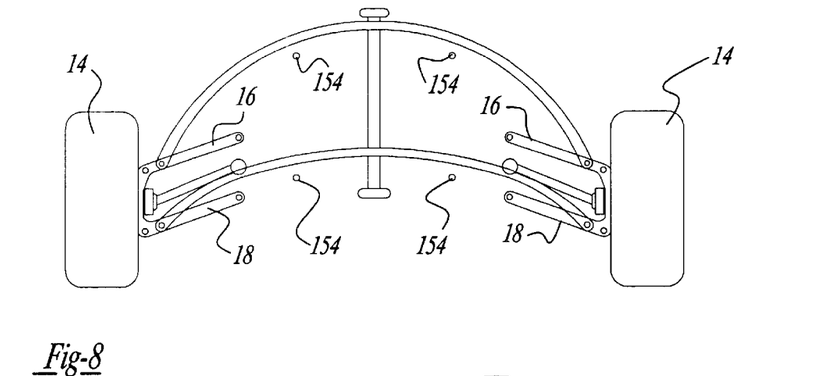
FIG. 8 is a front view of the suspension system of the vehicle in an off-road configuration.
Figure 9:
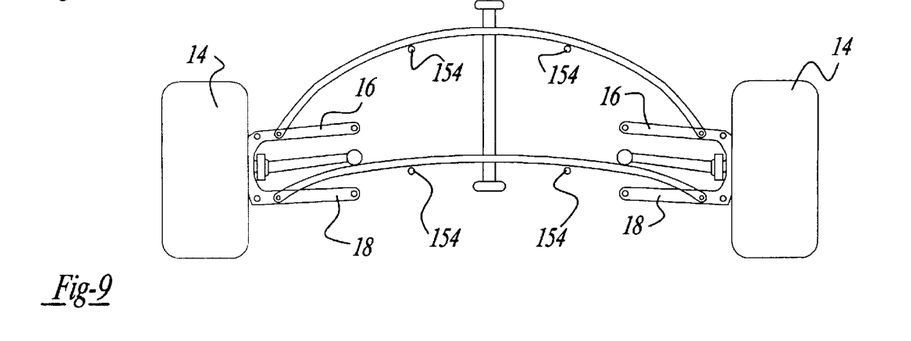
FIG. 9 is a front view of the suspension system of the vehicle in an on-road configuration.

When mode-select lever 64 is in a preferred operating mode, thumb actuator 106 is released in order to retain the mode-select lever 64 in position. Thereafter, rotating end cap 134 of handle 126 is positioned in one of its ratcheting positions—raise suspension, lower suspension, or neutral. Handle 126 may then be ratcheted about hub 124 to drive driving bevel gear 120. Driving bevel gear 120 drives driven bevel gear 68. Driven bevel gear 68, through spline connection 96, rotates rotating sleeve 76, first driving gear 70, and second driving gear 72. Depending on the operating mode selected of the mode-select assembly 22, first 70 and/or second 72 driving gear respectively engages front primary gear 52 and rear primary gear 58, thereby driving front secondary gear 54 and rear secondary gear 60, respectively. Through belts 56, 62, front threaded spindle 38 and rear threaded spindle 40 drive the front set of leaf springs 26 and the rear set of leaf springs 28. More particularly, as seen in FIG. 8, in an off-road configuration, at least one set of leaf springs 26, 28 is raised to provide increased ground clearance. On the other hand, as seen in FIG. 9, in an on-road configuration, at least one set of leaf springs 26, 28 is lowered against physical stops 154 extending from vehicle 12 to provide decreased ground clearance and improved handling.

By way of non-limiting example, the adjustable suspension system of the present invention enables a vehicle to realize a ground clearance adjustability of approximately 5½".

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. An adjustable suspension for a vehicle, said adjustable suspension comprising:

a first pair of transversely disposed leaf springs supporting the vehicle, said first pair of leaf springs each having a threaded aperture formed therein;

a second pair of transversely disposed leaf springs supporting the vehicle, said second pair of leaf springs each having a threaded aperture formed therein;

a first threaded rotatable spindle extending through said apertures of said first pair of leaf springs for adjusting the curvature of said first pair of leaf springs;

a second threaded rotatable spindle extending through said apertures of said second pair of leaf springs for adjusting the curvature of said second pair of leaf springs;

actuating means for rotatably driving at least one of said spindles;

mode selection means for selectively engaging said actuation means with at least one of said spindle in response to a preferred operating mode, said mode selection means comprising:

a pivotable lever being positionable in a first, a second, and a third position, whereby said first position operably interconnects said actuation means with said first spindle to enable said actuation means to drive only said first spindle, said second position operably interconnects said actuation means with said second spindle to enable said actuation means to drive only said second spindle; and said third position operably interconnects said actuation means with said first and second spindles to enable said actuation means to drive both said first spindle and said second spindle;

an adjustment spindle assembly being pivotally coupled to said lever, said assembly having a rotatable spindle, a first driving gear, and a second driving gear, said first and second driving gear being fixed to said rotatable spindle, said first driving gear driving said first spindle, said second driving gear driving said second spindle; and a first bevel gear slidably coupled to said rotatable spindle for rotation therewith, said first bevel gear being driven by said actuating means.

2. The adjustable suspension according to claim 1 wherein said actuation means comprises:

a hub member, a handle being coupled to said hub member, said handle pivotable about said hub member;

a second bevel gear for outputting said rotational motion, said second bevel gear operably engaging said first bevel gear; and a ratcheting mechanism disposed within said hub member, said ratcheting mechanism selectively actuating said second bevel gear in response to pivotal motion of said handle, thereby providing said rotational motion.

3. The adjustable suspension according to claim 2 wherein said ratcheting mechanism comprises:

a shaft extending from said second bevel gear;

a pair of ratchet gears being fixed to said shaft; and a pair of locking arms being coupled with said handle for pivotal motion therewith, said pair of locking arms selectively engaging one of said pair of ratchet gears for pivotally rotating said second bevel gear in response to pivotal rotation of said handle.

4. The adjustable suspension according to claim 1 wherein said first pair and said second pair of leaf springs each includes a top leaf spring defining a first curvature and a bottom leaf spring defining a second curvature, wherein said first curvature is greater than said second curvature.

5. An adjustable suspension system for a vehicle, said suspension system comprising:

a first pair of transversely disposed leaf springs supporting the vehicle, said first pair of leaf springs each having a threaded aperture formed therein;

a second pair of transversely disposed leaf springs supporting the vehicle, said second pair of leaf springs each having a threaded aperture formed therein;

a first threaded rotatable spindle extending through said apertures of said first pair of leaf springs for adjusting the curvature of said first pair of leaf springs;

a second threaded rotatable spindle extending through said apertures of said second pair of leaf springs for adjusting the curvature of said second pair of leaf springs;

a handle device for providing rotational motion; and a selection device being operably coupled to said handle device, said selection device being positionable in a first, a second, and a third position, whereby said first position operably interconnects said handle device with said first spindle to enable said handle device to drive only said first spindle, said second position operably interconnects said handle device with said second spindle to enable said handle device to drive only said second spindle; and said third position operably interconnects said handle device with said first and second spindles to enable said handle device to drive both said first spindle and said second spindle.

6. The suspension system according to claim 5 wherein said selection device comprises:

a pivotable lever being positionable in said first, second, and third positions;

an adjustment spindle assembly being pivotally coupled to said lever, said assembly having a rotatable spindle, a first driving gear, and a second driving gear, said first and second driving gear being fixed to said rotatable spindle, said first driving gear driving said first spindle, said second driving gear driving said second spindle; and a first bevel gear slidably coupled to said rotatable spindle for rotation therewith, said first bevel gear being driven by said ratcheting device.

7. The suspension system according to claim 6 wherein said handle device comprises:

a hub member;

a handle being coupled to said hub member, said handle pivotable about said hub member;

a second bevel gear for outputting said rotational motion, said second bevel gear operably engaging said first bevel gear; and a ratcheting mechanism disposed within said hub member, said ratcheting mechanism selectively actuating said second bevel gear in response to pivotal motion of said handle, thereby providing said rotational motion.

8. The suspension system according to claim 7 wherein said ratcheting mechanism comprises:

a shaft extending from said second bevel gear;

a pair of ratchet gears being fixed to said shaft; and a pair of locking arms being coupled with said handle for pivotal motion therewith, said pair of locking arms selectively engaging one of said pair of ratchet gears for pivotally rotating said second bevel gear in response to pivotal rotation of said handle.

9. The suspension system according to claim 5 wherein said first pair and said second pair of leaf springs each includes a top leaf spring defining a first curvature and a bottom leaf spring defining a second curvature, wherein said first curvature is greater than said second curvature.

* * * * *